United States Patent

[11] 3,624,503

| [72] | Inventor | George W. Barrowcliff<br>Euless, Tex. |
|---|---|---|
| [21] | Appl. No. | 813,452 |
| [22] | Filed | Apr. 4, 1969 |
| [45] | Patented | Nov. 30, 1971 |
| [73] | Assignee | LTV Aerospace Corporation<br>Dallas, Tex. |

[54] MEANS AND METHOD FOR DETECTING STRAY ELECTRICAL ENERGY, ABOVE A PREDETERMINED LEVEL, ON A CONDUCTOR
17 Claims, 2 Drawing Figs.

[52] U.S. Cl. .................................................. 324/133,
340/248
[51] Int. Cl. .................................................. G01r 19/16
[50] Field of Search .................................. 324/51,
110, 115, 133, 72.5, 122, 96; 340/248, 249

[56] References Cited
UNITED STATES PATENTS

| 2,865,000 | 12/1958 | Newell | 324/115 |
| 2,929,024 | 3/1960 | Foster et al. | 324/115 |
| 3,005,156 | 10/1961 | Hoberman | 324/115 |
| 3,038,080 | 6/1962 | Matarese | 324/133 X |
| 3,072,895 | 1/1963 | Kaufman | 324/133 X |
| 3,237,102 | 2/1966 | Newell | 324/115 |
| 3,356,939 | 12/1967 | Stevenson | 324/51 |
| 3,437,916 | 4/1969 | Mazurkevics | 324/133 X |
| 1,796,637 | 3/1931 | Trogner | 324/122 |
| 3,332,011 | 7/1967 | Maione et al. | 324/96 |

*Primary Examiner*—Gerard R. Strecker
*Attorneys*—H. C. Goldwire and Charles W. McHugh ABSTRACT: A method and apparatus for detecting stray electrical energies imposed on a conductor whereby the levels of the energies to be detected range from a given, low level to a given, higher level and the detection is accomplished by detecting any energies present at successively reduced levels from the given, higher level to the lowest energy level desired to be detected.

PATENTED NOV 30 1971 3,624,503
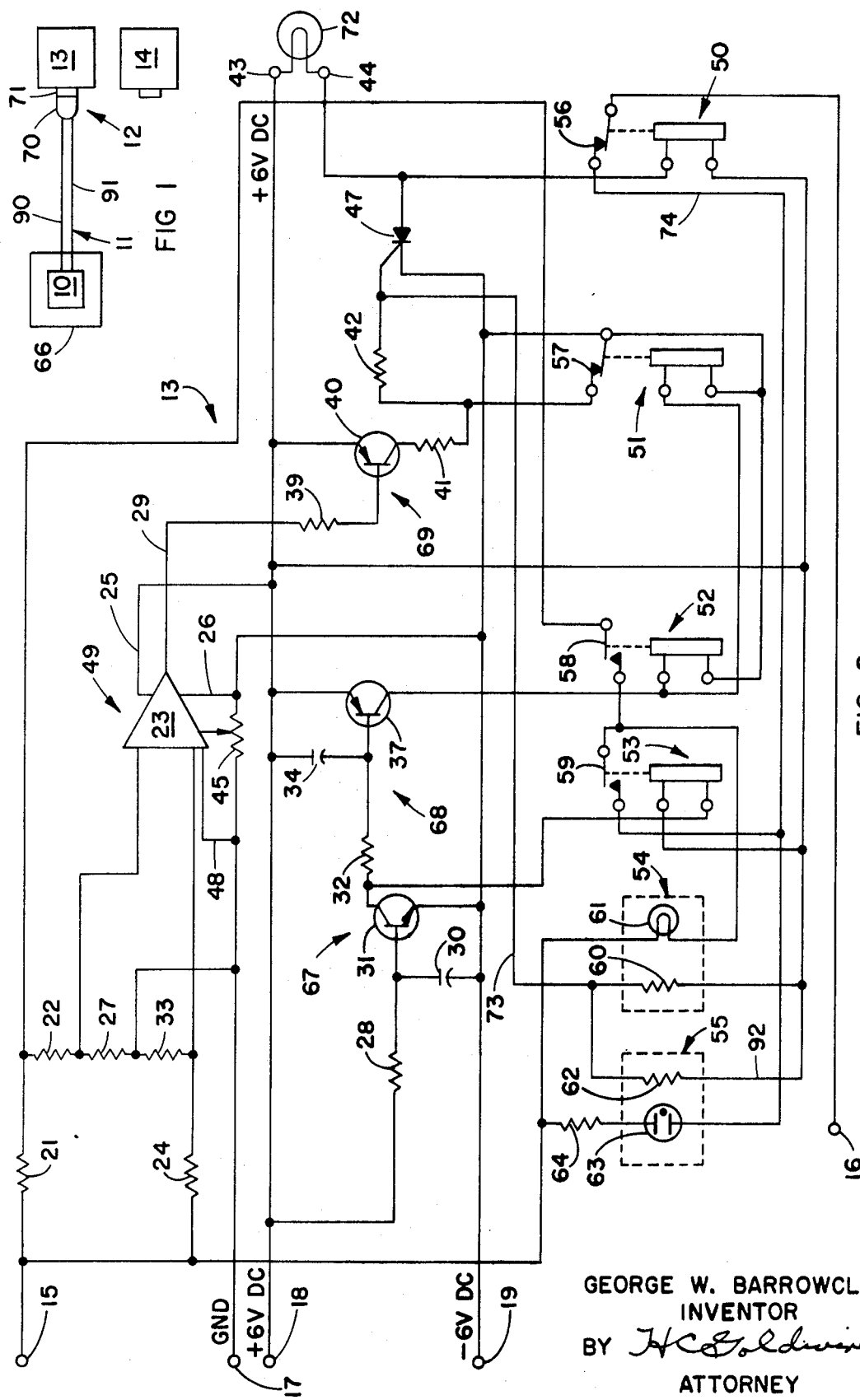
GEORGE W. BARROWCLIFF
INVENTOR
BY H C Goldwire
ATTORNEY

MEANS AND METHOD FOR DETECTING STRAY ELECTRICAL ENERGY, ABOVE A PREDETERMINED LEVEL, ON A CONDUCTOR

This invention relates to improvements in apparatus for detecting stray electrical energies and, more particularly, to a device for detecting stray electrical energies having diverse, possible energy levels imposed on a conductor forming a part of the firing circuit of an explosive device and to a method for accomplishing the detection of such energies.

Modern industrial and military equipments utilize a variety of electrically ignited explosive devices, and it is common practice when arming these devices to take adequate safety precautions to avoid an accidental ignition which might cause serious injury to personnel and damage to equipment. An electrical firing circuit having an electrical conductor is connected to the explosive device to arm the same, and it is known that electrical signals can be induced within the circuit by various sources of electrical energy external to the apparatus and associated with the firing circuit as, for instance, a radio transmitter producing electromagnetic waves which are coupled with the conductor. The induced electrical signals can ignite the explosive device provided the energy level imposed on the circuit by the coupled electromagnetic waves exceeds the threshold of energy required for ignition of the device. Equipment has been designed and built which may be connected to the electrical circuit to test for the presence of this induced energy, at least as it exceeds some predetermined level which is related to the threshold for ignition and which usually provides an adequate safety margin with respect to the ignition threshold. This level of induced energy is usually low and in the order of a few millivolts to 1 or 2 volts of electrical energy; and it includes only that energy which appears on the firing circuit conductor when the circuit is not intentionally energized. Such energy is commonly referred to as stray energy, and the test set used to test for the presence of this energy is commonly referred to as a stray voltage detector or, preferably, a stray energy detector.

When the explosive device is installed on complex apparatus, for example, an aircraft or a missile, the stray energy problem becomes more complex than in the simple case set forth above. A missile has many potential stray energy sources in that it depends for its operation on direct and alternating current energies at various voltage levels and, in the case of the alternating current energies, at various frequencies; and it often has a guidance radar and other similar equipment which may induce low-level energies of the type previously described. Additionally, the direct current energy may be used to drive motors, synchros, or the like in first one direction and then the other, such that there is often direct current which is either positive or negative with respect to an electrical ground. Experience has shown that energy of any one or of a combination of the types described often appears on the conductor because of either an erroneous connection, a short circuit, a component malfunction, or some similar occurrence; thus, the range of the energy levels of the potential stray energy which may appear and must be detected on the conductor is substantially large with respect to the low-level induced energy first discussed.

Prior art, stray energy detectors suitable for detecting low-level induced energy are impractical for use in association with conductors where an increased range of potential stray energy is present, for a sensitive circuit suitable for measuring stray voltages at low energy levels would be damaged or destroyed upon the application of, for example, a 115- to 120-volt volt alternating current signal. In the past, detectors of stray electrical energy for use in association with an electrical conductor subject to the possibility of having imposed thereon stray electrical energies at a given, high level have not been capable of detecting all energies imposed on the conductor, including the high-level energy, without incurring damage to the test set. Further, the possibility of human error when employing a manually operated testing device is intolerably large; for the possible consequences of accidental omission of testing at, for example, a particular level of stray energy are often profound and tragic. Additionally, negative DC voltages, if of sufficient magnitude, can cause an accidental ignition of an ordnance device; but detection of negative DC voltages has been particularly elusive, for the only device used in the prior art for its accomplishment has been a voltmeter or the like. Since a negative voltage will produce a deflection of the meter in the negative direction, the deflection is difficult to see and often goes unnoticed. In order to read the actual magnitude of the negative energy, the meter leads must be reversed; thus, additional difficulty and uncertainty are introduced. Once the leads are reversed, as described, an operator may fail to return the leads to their original position before proceeding with the test, such that positive voltages on the conductor may go unnoticed, thereby resulting in a defective test.

Therefore, a major object of this invention is to provide an improved stray energy detector.

Another object is to provide a stray energy detector having a substantially increased detecting range with respect to the potentially possible energy levels to be detected.

A further object is to provide a stay energy detector which detects various types of electrical stray energies, including alternating and direct current energies.

A still further object is to provide a stray energy detector for detecting stray electrical energies at least a portion of which are negative with respect to others.

A still further object is to provide a stray energy detector of improved reliability.

An additional object is to provide a method for accurately detecting stray electrical energies imposed on a conductor within a wide range of possible voltage levels.

Other objects and advantages will be apparent from the specification and claims and from the accompanying drawing illustrative of the invention. In the drawing:

FIG. 1 is a schematic drawing illustrative of the relationship of the apparatus of this invention to the electrical circuit which is to be tested for stray electrical energy; and FIG. 2 is a schematic drawing of the electronic circuit of a preferred embodiment of the detector of stray electrical energy.

FIG. 1 illustrates the association of a stray energy detector 13 of this invention to an explosive device 14, a firing circuit 11, a firing mechanism 10, and a potential stray energy source 66. To provide a convenient example, the explosive device 14 will be described, in the following material, as an ordnance device. The stray energy detector 13 is attached by a connector 12 to the electrical circuit 11, which includes conductors 90, 91 employable for connecting the remote firing mechanism 10 of an electrically operated ordnance system to the ordnance device 14. The remote firing mechanism 10 is associated with a potential stray energy source 66, which may be equipment of an aircraft, submarine or the like. The connector 12, which is eventually to be attached to the ordnance device 14, is first attached to the stray energy detector 13, and the detector is employed to check the circuit 11 to assure that there is no stray energy on the conductor 90 or 91 of a magnitude sufficient to ignite the ordnance device. It will be apparent that the detector 13 is useful in association with any circuit or cable where it is desirable to assure that stray energy imposed on the cable is of less than a predetermined level.

FIG. 2 illustrates a circuit for a preferred embodiment of the stray energy detector 13 which includes a plurality of detecting means, such as 49, 54, and 55, connectable to the conductor of linking circuit 11 (FIG. 1) for detecting stray electrical energies imposed thereon and including a first one of said means having an energy-detecting range for detecting higher level energies and further including at least one other means having an energy-detecting range extending lower than others of the means. Terminals 15 and 16 are located in the second portion 71 of the connector 12 of FIG. 1 and provide a connection, through the connector second portion 70, between the linking circuit 11 of FIG. 1 and the circuit of the detector 13. Terminals 18 and 19 are connected respectively to a positive and a negative 6-volt DC power supply, each such voltage being relative to a power supply ground which is connected to terminal 17. The detector 13 is electrically connected, internally, as follows. Stray energy from the conductor 90 or 91 of linking circuit 11 (FIG. 1) is applied to the circuit of the detector 13 (FIG. 2) via terminals 15 and 16 and is fed from terminal 16 to a first terminal on the normally closed contacts 56 of a relay 50; and a second and opposite terminal of contacts 56 is connected via a lead 74 to a first detecting means, indicated generally at 55, which includes a gas-filled light source 63 and a photosensitive resistor 62. The light source 63 has first and second plates, and the lead 74 from relay 50 is connected to the first plate, while the second plate is connected through resistor 64 to terminal 15, which is in the side of the linking circuit opposite from that occupied by terminal 16. The photosensitive resistor 62 is positioned to receive illumination directly from the light source 63 and has a first lead 92 connected to the positive 6-volt DC supply at terminal 18 and second lead 73 connected to the gate electrode of a silicon controlled rectifier 47.

A second detecting means is indicated generally at 54 and includes a light source such as an incandescent lamp 61 and a photosensitive resistor 60. The photosensitive resistor 60 is positioned with respect to the incandescent light source 61 to receive illumination therefrom and is connected in parallel with resistor 62. The light source 61 has a first lead connected to terminal 15 and a second lead connected to a first terminal of normally open contacts 59 of relay 53.

Means for causing the plurality of detecting means 49, 54, and 55 to operate in a sequence beginning with the first detecting means 55 and ending with the one of the means 49, 54 having the lowest energy-detecting range includes, in the embodiment illustrated, a connector 12 (FIG. 1), which simultaneously connects terminals 15 and 16 to the linking circuit 11 (FIG. 1) when the first half 70 (FIG. 1) of the connector, which is fixed to the linking circuit 11, is mated with the second half 71, which is fixed to the detector 13. It will be apparent, however, that a switch can be provided internally or externally of the detector 13 to make the connection in a more convenient manner; thus, the switching means referred to in the material that follows may constitute the connector halves 70, 71 employed as above or, alternatively, a switch. The means for causing the detecting means to operate in sequence further includes a circuit, indicated generally at 67, for delaying the operation of the second detecting means 54 until the first detecting means 55 has had ample time to respond to a stray energy input of sufficient magnitude to be detected by the first means. The delaying circuit 67 includes an NPN-transistor 31 having its emitter junction connected to the −6-volt DC supply at terminal 19 and having its base connected through a resistor 28 to the +6-volt DC supply and through a capacitor 30 to the −6-volt DC supply. The collector of transistor 31 is tied directly to a first terminal of the coil of a relay 53, which relay is also included in the means for delaying the operation of the detecting means 54 and which first terminal is tied through resistor 32 to the base of transistor 37. The second terminal of the coil of relay 53 is tied through a lead to the +6-volt DC supply. The second terminal of the normally open contacts 59 of relay 53 is tied through contacts 56 of relay 50 to the input terminal 16.

A third detecting means is shown generally at 49. In the embodiment shown, the detecting means 49 includes a sensing amplifier provided with operating voltages by a lead 25 connected to the +6-volt DC supply and a lead 26 connected to the −6-volt DC supply. A second means for delaying the operation of detecting means 49 is shown generally at 68 and includes a relay 52. As previously described, the base of transistor 37 is connected through resistor 32 to the collector of transistor 31. The base of transistor 37 is also connected through a capacitor 34 to the +6-volt DC supply. Further, transistor 37 is a PNP-transistor and has its emitter connected to the +6-volt DC supply, and its collector is tied to a first terminal of the coil of a relay 52 having a second terminal connected to the −6-volt DC supply. The normally open contacts 58 of relay 52 have a first terminal connected to the first terminal of the contacts 59 of relay 53 and a second terminal connected through a resistor 22 to a first terminal of the input of the amplifier 23, this second terminal being also connected through the resistor 21 to terminal 15. Resistor 21 is adjusted in size to match the impedance of the ignition circuit of the ordnance device 14 (FIG. 1). A second input terminal of the amplifier 23 is connected through a resistor 24 to terminal 15. The amplifier 23 has an output terminal which is connected through lead 29 and resistor 39 to the base of a PNP-transistor 40. The circuit indicated generally at 69 and including transistor 40 forms a part of the detecting means 49, and the transistor 40 has its emitter connection tied directly to the +6-volt DC supply. The collector of transistor 40 is tied through resistor 41 to a first terminal of normally closed contacts 57 of a relay 51. A resistor 42 connects the first terminal of contacts 57 of the relay 51 to the gate electrode of a silicon-controlled rectifier 47.

The rectifier 47 is operative in response to a signal from any one of the detecting means 49, 54, or 55 to provide a means for indicating detection of stray electrical energy by any one of the detecting means. In the embodiment shown, a lamp or other indicating device 72 is connected between terminals 43 and 44. The terminals 43 is connected to the +6-volt DC supply and terminal 44 is connected to the anode of rectifier 47 and to a first terminal on the coil of relay 50. A second terminal of the coil of relay 50 is connected to the +6-volt DC supply. The cathode of rectifier 47 is connected to the −6-volt DC supply, and it has been previously stated that the anode of rectifier 47 is tied to terminal 44; thus, it is clear that when the rectifier is made to conduct, as by the application of a gating signal, terminal 44 is connected through rectifier 47 in such manner that a 12-volt DC potential difference is applied across terminal 43 and 44 to operate the lamp or other indicating apparatus 72.

The relay 51 has a coil connected in parallel with the coil of relay 52 and has a first terminal that is connected to the first terminal of the coil of relay 52 and a second terminal connected to a first terminal of its own normally closed contacts 57, which latter terminal is also connected to the −6-volt DC supply.

The sensing amplifier 23 is, for example, a Motorola Model MC1540 which operates from a low-level signal input to produce an output voltage which is indicative that a predetermined input energy level has been exceeded. The sensing amplifier 23 provides an output of +6-volt DC on the output lead 29, and upon the application of at least 17 millivolts of energy at the input, the output drops to approximately 0.4-volts DC for a predetermined period of time. For all values of input voltage less than 17 millivolts, no output voltage change is produced. A voltage divider network is provided and is associated with the input of the amplifier 23 to proportion the minimum stray energy level to be detected by detector 13 to a suitable value to operate the sensing amplifier. Resistors 27 and 33 are connected in series with each other across the input terminals of the amplifier 23. Resistors 22, 27, 33 and 24 are in series with each other and are in parallel with the load resistor 21, and the resistance values of resistors 27 and 33 are proportioned with respect to the values of resistors 22 and 24 such that the voltage drop across resistors 27 and 33 provides a proper voltage drop, at a given detecting voltage, to cause the sensing amplifier 23 to operate. In the embodiment illustrated, when the voltage across resistor 21 reaches at least 50 millivolts, the voltage drop across the series combination of resistors 27 and 33 is at least 17 millivolts. The center connection between resistors 27 and 33 is tied to the power supply ground at terminal 17. It is desirable to have the input detection range of the sensing amplifier 23 adjustable to some extent in order to be able to match the input detection voltage to the voltage drop across resistors 27 and 33 to thereby improve the accuracy of the detection and to compensate for nonlinear characteristics of the circuit components and/or amplifier. Thus, resistor 45 is connected between the −6-volt DC supply and the power supply ground (terminal 17), and a wiper connected to the amplifier 23 is adjustable for providing that a proportionate part of the voltage drop across the resistor 45 may be used internally of the amplifier to effect the proper compensation. Additionally, amplifier 23 has a ground connection which is connected through a lead 48 to the power supply ground at terminal 17, and the output of the amplifier is applied through lead 29 and resistor 39 to the base of transistor 40.

In operation, the detector 13 is attached, through connecting means including the connector 12 (FIG. 1) and/or a switch, to the electrical circuit 11 (FIG. 1). If there is no stray energy in the circuit which exceeds in magnitude the predetermined, lowest energy detection threshold, none of the detecting means of detector 13 is actuated and nothing happens within the detecting circuit, thus indicating that there is no stray energy of a harmful magnitude in the circuit 11. If there is stray energy above the desired, minimum detectable level, however, when the connecting means is actuated, the stray energy is applied across the terminals 15 and 16 (FIG. 2) upon their connection to the linking circuit 11 (FIG. 1). As previously described, the detector 13 (FIG. 2) includes a plurality of detecting means which operate sequentially, and each detecting means has a threshold for detection which is reduced with respect to the next preceding detecting means of the sequence. Energy of a predetermined, high level with respect to the range of possible energies that may be imposed on the conductor is detected by a first detecting means, and the next detecting means detects at a lower threshold. As will be described, this sequence is continued until terminated by operation of a means for detecting the lowest level energy desired to be detected.

Referring to FIG. 2, is a first electrical load is presented to the stray energy and includes the gas-filled light source 63 and the resistor 64. Note that the load 63, 64 is connected to the input terminal 16 through normally closed contacts 56 of relay 50.

If the stray energy exceeds a predetermined level, the gas-filled light source 63 conducts to provide illumination of the photosensitive resistor 62. In the particular embodiment illustrated, the first detecting means 55 is designed to detect an energy level in the region of 115–120 volts of alternating current, and this level was chosen because a device with which the particular firing circuit is associated employs 115-volt AC power and is a possible source of stray energies. Accordingly, the light source 63 is a neon bulb which will conduct upon the application of alternating current energy corresponding to approximately 90 volts of alternating current. When the light source 63 conducts, the illumination provided thereby causes the total resistance of the photosensitive resistor 62 to decrease substantially, and current flows through the resistor from the +6-volt DC supply to the gate of the silicon-controlled rectifier 47, thus causing the rectifier to conduct and to provide a path for current extending from the +6-volt DC supply through terminal 43, through the indicating device 72 connected across terminals 43 and 44, and from terminal 44 through the rectifier 47 to the −6-volt DC supply. Thus, the lamp 72 lights and there is provided a visual indication that stray energy of an undesirable magnitude (in this case, exceeding 90-volt AC) is present on the conductor. Additionally, when the rectifier 47 conducts, a current path is provided from the +6-volt DC supply to the second terminal of the coil of relay 50, through the coil, and from the first terminal of the coil through the rectifier 47 to the −6-volt DC supply; thus, a potential difference of 12 volts is applied across the relay coil and the relay is activated to open the normally closed contacts 56 and to disconnect the input terminal 16 from the remainder of the detecting circuit 13. The relay 50, therefore, is a protecting means associated with at least some of the detecting means, such as 49 and 54, to protect them from damage. For instance, 115–120-volt, 400-cycle power applied to the input of amplifier 23 predictably would destroy the amplifier, and resistors and components for use in a 50-millivolt testing circuit, which happens to correspond to the lowest energy-detecting level of one form of the device illustrated, include low-wattage components; thus, these components would be destroyed by the direct application of a similar, 115–120-volt stray energy signal. As will be explained, other detecting means, specifically means 55 and 49, which are operative at reduced threshold levels also operate to switch rectifier 47 on in the event that stray energy of a corresponding energy level is detected. Thus, relay 50 is operated by successive ones of the detecting means to open the circuit 13 and to protect subsequent ones of the detecting means operative at reduced threshold levels from damage.

The manner in which the signal is applied from a particular detecting means to the gate of rectifier 47 is explained in the material that follows. Even though detecting means 49 is the final one of the plurality of detecting means to operate in sequence, relay 50 is still used to open the circuit in response to detection by means 49 in order to protect the sensitive amplifier 23 from possible high-voltage transients on the conductor 90 or 91 and to prevent damage to the load resistor 21. In one form of the embodiment illustrated, the lowest threshold for detection is set for 50 millivolts of stray electrical energy, and the resistance of a typical ordnance device ignition circuit is 1 ohm; therefore, the resistor 21 is set at a value of 1 ohm in order to match the ignition circuit impedance. Further, it is necessary to use a low-wattage device in order to conserve space; thus, it is apparent that the resistor will be highly susceptible to destruction by high-voltage transients if adequate protection is not provided. Note, however, that the load resistor 21 is not located in the circuit of the detecting means 54 and 55 and is therefore not susceptible to damage by the application of energy of the higher levels.

If stray energy of a magnitude of less than 90 volts is on the conductor and the test switch is actuated, the light source 63 is not lit, and the first detecting means 55 does not cause the rectifier 47 to be switched on, and the indicating means 71 does not operate until the lower level stray energy is applied to the detecting means 54, which has the next lower energy-detecting threshold. In the embodiment shown, the detecting means 54 is designed to operate upon the application of at least 5 volts of direct or alternating current energy. The at least 5 volt range includes and will detect the +28-volt DC potential energy source commonly employed in airplanes and missiles; where the detector 13 is to be used in some other application, the threshold of the detecting means 54 and 55 is selected to correspond to potential sources of stray energy found in the device with which the detector is to be associated. It will also be apparent that the threshold of each detecting range of this embodiment is related to one or more potential (i.e., possible) sources of stray energies, and the threshold of each range is set at a value somewhat lower than the possible, maximum energy level of a respective source in order to allow for electrical loadings of the potential source of stray energy, which loading might cause the voltage of the possible, stray energy to be reduced with respect to its normally predictable voltage. At the same time, the threshold of a particular, higher range is set sufficiently high, with respect to the next lower range of the sequence, to assure that the detecting means of the next lower range is not injured by the application of energy at too high a level to be endured by its components. The light source 63 conducts upon the application of a given potential; for instance, bulbs are available which will conduct at any one of a variety of voltage levels and will operate on direct current as well as alternating current so that the threshold for the detecting means can be adjusted accordingly to suit a particular need.

Before the detecting means 54 is allowed to operate, it is necessary to assure, by operation of the delaying means 67, that the detecting means 55 has had ample time in which to respond to stray energy of a magnitude suitable for its detection. At the instant that the connecting means is activated (such as when connector portion 70 of FIG. 1 is mated to connector portion 69) and stray energy is thus applied to terminal 16, current begins to flow into the resistance-capacitance combination formed by resistor 28 and capacitor 30, and capacitor 30 begins to charge at a rate determined by the voltage (+6-volt DC) applied to the combination, the amount of capacitance, and the size of the resistor 28. As the voltage on capacitor 30 (and thus on the base of transistor 31) builds to a value to bias the emitter-base junction sufficiently, transistor 31 conducts, and current flows from the +6-volt DC supply, through the coil of relay 53, and through the collector-emitter circuit of transistor 31 to the −6-volt DC supply; thus, a potential difference of 12 volts is applied to the coil of relay 53, and the relay's normally open contacts 59 close and provide for stray energy a path extending from terminal 16, through contacts 56 of relay 50, and through contacts 59 of relay 53 to detecting means 54 and specifically to incandescent light source 61. Stray energy applied to light source 61 in this manner (across terminals 15 and 16) causes the incandescent bulb 61 to provide illumination to the photosensitive resistor 60. Since the stray energy, whether positive or negative, is imposed across terminals 15 and 16 and thus across the light bulb 61, the bulb lights without regard to the polarity of the imposed stray energy. The amount of illumination produced by light source 61 increases as the voltage across terminals 15 and 16 rises from some lower value toward a value of 5 volts, and the resistor 60 has a nonlinear characteristic such that the illumination of the resistor must reach a certain intensity before the total resistance is substantially reduced. Further, the current applied to the gate electrode of rectifier 47 must exceed a given value before the rectifier will conduct. These parameters are, adjusted, in the embodiment illustrated, in such a manner that an energy level corresponding to approximately 5 volts of direct current causes the resistance of resistor 60 to decrease sufficiently to allow sufficient current to reach the gate electrode of rectifier 47 for causing the rectifier to conduct. The delay provided by the delaying means 67 includes a sufficient response time for relay 50 to operate subsequent to the operation of rectifier 47 in response to the detection of stray energy in excess of 90-volt AC by detecting means 55. Additionally, the relay 50 operates to disconnect the circuit 13 from the conductor when stray voltage exceeding 5 volts is sensed by detecting means 54, just as it does in response to detection of stray energy of a proper level by detecting means 55.

Once the delaying means 67 has operated to connect detecting means 54 across terminals 15 and 16, a second delaying means 68 is required to allow ample response time for the operation of detecting means 54. As transistor 31 of delaying means 67 conducts, subsequent to an appropriate delay, the resistor 32 and capacitor 34 are effectively placed in series between the +6-volt DC supply and the −6-volt DC supply, and capacitor 34 begins to charge at a rate established by the values of the resistors 32 and the capacitor 34. As the capacitor 34 charges, the negative potential of the capacitor is applied to the base of transistor 37 to bias the emitter-base junction and cause the transistor to conduct. Again, as with the first delaying means 67, the transistor does not conduct until the capacitor 34 has been charged for a predetermined period of time; again, this delay is set to provide ample response time for operation of the detecting means 54 and, upon stray energy of a sufficient magnitude being present, for operation of the rectifier 47, the indicating device 72, and the relay 50.

When transistor 37 conducts, a current path is provided from the +6-volt DC supply through the transistor and the coil of relay 52 to the −6-volt DC supply, whereby there is applied to relay 52 a 12-volt potential that closes the normally open contacts 58. With the contacts 58 closed, a direct path for stray energy is provided from terminal 16 through contacts 56 of relay 50, 59 of relay 53 (which contacts are closed subsequent to the operation of delaying means 67), closed contacts 58 of relay 52, and to the common junction of resistors 21 and 22 for introduction into the third detecting means, shown generally at 49.

The circuit shown generally at 69 and the amplifier 23 operate together as important elements of the sequencing means of the detector 13, for the rectifier 47 requires a gating current of a predetermined magnitude in order for the rectifier to switch. The gating current is produced easily by detecting means 54 and 55, for the energy levels detected there are of sufficient magnitudes. At the energy level detected by detecting means 49, however, a gating pulse of sufficient magnitude must be otherwise produced. The circuit 69 is included, therefore, as a current-producing means responsive to the amplifier 23 for producing a gating signal of sufficient magnitude to switch the rectifier 47 when the stray energy detected by means 49 is of too low a level to produce that current of itself. Whenever stray energy exceeding the 17-millivolt level is applied to the input of amplifier 23, the internal operation of the amplifier causes the amplifier output to switch quickly from +6-volt DC to about 0.4 volts and causes the output to remain at that level for some predetermined period of time. The +6-volt DC output applied to the base of transistor 40 acts to bias the transistor so that it will not conduct, but when the +6-volt DC output of the amplifier 23 falls to 0.4 volts, a base-emitter bias is established by resistor 39 and transistor 40 conducts, thereby providing a current path from the +6-volt DC supply through resistors 41 and 42 to the gate of the rectifier 47 for switching the rectifier on. Again, as the rectifier 47 is switched on, the indicating device 72 and the relay 50 are activated.

The coil of relay 51 is in parallel connection with the coil of relay 52, and when, pursuant to a delay interposed by delaying means 68, relay 52 is activated, there is simultaneous activation of relay 51, thereby opening contacts 57 and removing −6-volt DC from the common junction of resistors 41 and 42. A potential of −6-volt DC applied to this junction places a sufficient negative voltage on the gate of rectifier 47 to assure that positive, high-level transient voltages caused by relay switching or the like and which might be sensed by the amplifier 23 do not operate through the amplifier to turn the rectifier 47 on to provide an erroneous stray energy indication. Because of the relatively high energy levels detected by detecting means 54 and 55, a gating signal from either one of those means subsequent to the operation of delaying means 67 overrides the −6-volt DC to cause the rectifier 47 to switch.

Previous methods for detecting stray electrical energies imposed on a conductor have not utilized a multiple-range concept; rather, they have been directed solely to the detection of low-level induced energies such as the energies which can be induced in a conductor by placing it in association with the transmitted electromagnetic waves of a radio transmitter. Nevertheless, energies of magnitudes many times that of a typical radio frequency induced energy can often be found on the conductor. A detection circuit for detecting, for example, 50 millivolts of induced energy would be damaged or destroyed by energy of higher levels. However, the present method for detecting stray electrical energy in an electrical conductor subject to the possibility of having imposed thereon stray electrical energies at levels ranging from a given, low level to a given, high level is feasible; for the detection is accomplished by first detecting stray energy on the conductor at a detection range having a detection threshold and including the given, high level of possible stray electrical energy and then detecting stray energy on the conductor at ranges of successively reduced level, each range having a detection threshold which is lower than that of the next preceding detection range. In this manner, the detection is accomplished within each range by apparatus having the proper sensitivity to energy of the level associated with the respective range; thus, the detection of stray electrical energy is accomplished without incurring damage to the detecting equipment, and the accurate detection of low-level energy is accomplished in a safe manner.

It is apparent that other variations and modifications may be made without departing from the present invention. Accordingly, it should be understood that the forms of the present invention described above and shown in the accompanying drawings are illustrative only and not intended to limit the scope of the invention.

What is claimed is:
1. In combination with an electrical conductor forming a part of the firing circuit of an explosive device and subject to the possibility of having imposed thereon stray electrical energies at levels ranging from a given, low level to a given, higher level, a detector, associated with the electrical conductor, for detecting stray electrical energies occurring in the conductor, said detector comprising:

a plurality of detecting means connectable in parallel to the conductor for detecting stray electrical energies of any polarities imposed thereon and including a first one of said means having an energy-detecting range including said given, higher level and further including at least one other means having an energy-detecting range extending lower than the first;

sequencing means for causing the plurality of detecting means to operate automatically in a sequence until stray electrical energy is detected, beginning with connection of the first detecting means with the conductor and operation of the first detecting means and, upon no stray energy being detected, ending with connection with the conductor and operation of the one of said means having the lowest energy-detecting range; and means, connectable with respective ones of the detecting means, for indicating detection of stray electrical energy, for a period of time independent of the duration of the stray electrical energy, by any of the detecting means.

2. The stray energy detector claimed in claim 1 wherein the conductor is associated with a device having therein a plurality of potential stray energy sources, and the plurality of detecting means includes means for detecting stray energies imposed on said conductor by said sources.

3. The stray detector claimed in claim 1 wherein the conductor is associated with a device having therein a plurality of potential stray energy sources and wherein the plurality of detecting means includes means for detecting stray energies imposed on said conductor by sources in addition to those of said device.

4. The stray energy detector claimed in claim 1 wherein the first detecting means has an energy-detecting threshold corresponding to approximately 90 volts of electrical energy.

5. The stray energy detector claimed in claim 1 wherein at least one of said detecting means has an energy-detecting threshold corresponding to approximately 5 volts of electrical energy.

6. The stray energy detector claimed in claim 1 wherein at least one of said detecting means has an energy-detecting threshold corresponding to approximately 0.05 volts of electrical energy.

7. The stray energy detector claimed in claim 1 wherein said means for causing said detecting means to operate in a sequence includes means for automatically delaying the operation of at least one of said plurality of detecting means to provide adequate response time for at least one other, previously operated one of said detecting means.

8. The stray energy detector claimed in claim 1 wherein the plurality of detecting means includes at least three means for detecting stray electrical energies.

9. The stray energy detector claimed in claim 1 including protecting means associated with at least some of said detecting means for electrically disconnecting the detector from the conductor in response to detecting operation of said at least some of said means, to protect subsequently operable ones of said detecting means from damage by energy of a high level.

10. The stray energy detector claimed in claim 1 and including means for electrically connecting the detecting means to the conductor to start the detecting sequence.

11. The stray voltage detector claimed in claim 1 wherein at least one detecting means includes a gas-filled lamp which conducts at a voltage level corresponding to the lower limit of the energy level desired to be detected by said at least one detecting means, said detector further including a photosensitive resistor positioned to be illuminated by said lamp, whereby resistance of the resistor is reduced in response to said illumination, said photosensitive resistor, upon its resistance being reduced, constituting a means for conducting current to the means for indicating detection of stray electrical energy.

12. The stray energy detector claimed in claim 1 wherein at least one of said detecting means includes an incandescent lamp which provides a given level of illumination in response to a voltage corresponding to an energy level to be detected and a photosensitive resistor positioned to be illuminated by said lamp, whereby the value of the resistance is reduced by said illumination, said photosensitive resistor positioned to be illuminated by said incandescent lamp constituting, upon its resistance being reduced, a means for conducting current to the means for indicating detection of stray electrical energy.

13. The stray energy detector claimed in claim 1 wherein the means for indicating detection of stray electrical energy includes an electrically operated indicating device, a source of electrical power, and switching means for connecting said source of power to said electrically operated device, and wherein at least one of said detecting means associated with a low, energy-detecting range has associated therewith means for providing electrical current to said switching means to cause said switching means to switch and to connect said source of power to said indicating means.

14. The stray voltage detector claimed in claim 1 wherein at least a portion of the stray energies which may possibly be imposed on said conductor is negative with respect to other stray energies which may possibly be imposed on said conductor, and at least one of said detecting means is for detecting said negative portion.

15. The stray energy detector claimed in claim 1 wherein the means for indicating detection of stray electrical energy includes a silicon-controlled rectifier having a gate electrode to which a predetermined amount of current must be supplied to cause the rectifier to conduct to activate said means for indicating detection, and at least some of said detecting means have associated therewith means for producing at least said predetermined amount of current for application to the rectifier gate in response to the detection of stray electrical energy by said associated detecting means.

16. The stray energy detector of claim 7, wherein said detecting means having the lowest energy detecting range comprises a sensing amplifier means for causing a constant polarity change in amplifier output voltage in response to nonrectified input pulses of either polarity.

17. A detector for stray electrical energies for use in association with an electrical conductor forming a part of the firing circuit of an explosive device and subject to the possibility of having imposed thereon stray electrical energies at energy levels ranging from a given, low level to a given, higher level, said detector comprising:

a plurality of stray energy detecting means connectable in parallel to the conductor for detecting stray electrical energies imposed thereon and including a first one of said detecting means having energy-detecting range including said given, higher level and further including at least one other of said detecting means having an energy-detecting range extending lower than the first;

sequencing means for connecting the plurality of detecting means to the conductor in parallel and in a sequence which corresponds to the respective levels of the individual energy-detecting ranges of the respective detecting means and is limited to an order of effecting such connections beginning with connection of the first detecting means to the conductor and ending with connection to the conductor of the one of the detecting means having the lowest energy-detecting range;

means responsive to individual operation of each of the detecting means for indicating detection of stray electrical energy by any one of the detecting means, the means for indicating detection of stray electrical energy comprising a means for indicating detection of stray electrical energy for a period of time independent of the duration of the stray electrical energy; and means for electrically isolating all of the detecting means from the conductor in response to operation of any of the detecting means to indicate the presence of stray electrical energy on the conductor.

\* \* \* \* \*